United States Patent
Anderson et al.

(10) Patent No.: US 10,894,544 B2
(45) Date of Patent: Jan. 19, 2021

(54) PROTECTIVE ACTION FOR PROTECTING AUTONOMOUS VEHICLES FROM IMPENDING WEATHER CONDITIONS

(71) Applicant: International Business Machines Corporation, Armonk, NY (US)

(72) Inventors: Evelyn R. Anderson, Houston, TX (US); Michael Bender, Rye Brook, NY (US); Rhonda L. Childress, Austin, TX (US); Ea-Ee Jan, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 15/861,810

(22) Filed: Jan. 4, 2018

(65) Prior Publication Data
US 2019/0202463 A1    Jul. 4, 2019

(51) Int. Cl.
*B60W 40/02*    (2006.01)
*B60W 50/00*    (2006.01)
*G05D 1/00*    (2006.01)
*G05D 1/02*    (2020.01)

(52) U.S. Cl.
CPC ........ *B60W 40/02* (2013.01); *B60W 50/0097* (2013.01); *G05D 1/0088* (2013.01); *G05D 1/0214* (2013.01); *B60W 2555/20* (2020.02); *G05D 2201/0213* (2013.01)

(58) Field of Classification Search
CPC ...... B60W 30/06; B60W 40/02; B60W 40/06; B60W 50/0097; B60W 2555/20; G05D 1/0088; G05D 1/0214; G05D 1/1062; G05D 2201/0212; B62D 15/0285
See application file for complete search history.

(56) References Cited

U.S. PATENT DOCUMENTS

| | | | |
|---|---|---|---|
| 9,365,213 B2 | 6/2016 | Stenneth et al. | |
| 9,811,085 B1 * | 11/2017 | Hayes | G08G 1/148 |
| 9,944,282 B1 * | 4/2018 | Fields | G06Q 30/0207 |
| 10,018,475 B2 * | 7/2018 | Hakeem | G01C 21/3415 |
| 10,131,362 B1 * | 11/2018 | Gingrich | B60W 50/0098 |
| 10,395,332 B1 * | 8/2019 | Konrardy | G05D 1/0246 |

(Continued)

*Primary Examiner* — Peter D Nolan
*Assistant Examiner* — Ce Li Li
(74) *Attorney, Agent, or Firm* — Schmeiser, Olsen & Watts, LLP; Nicholas L. Cadmus

(57) ABSTRACT

A protective action system and method includes detecting the impending weather conditions for a geographic region, and in response to detecting the impending weather conditions, determining that an initial location of the autonomous vehicle is located in the geographic region affected by the impending weather conditions, calculating a current risk of damage to the autonomous vehicle based on the impending weather conditions in the geographic region and a current state of the autonomous vehicle, comparing the current risk of damage to a threshold of acceptable risk of damage, wherein, the current risk of damage exceeds a threshold of acceptable risk, assessing a user calendar to determine that taking a protective action by the autonomous vehicle is acceptable, and instructing the autonomous vehicle to take the protective action so that the current state of the autonomous vehicle is changed to a safe state to avoid damage from the impending weather conditions.

17 Claims, 13 Drawing Sheets

(56) References Cited

U.S. PATENT DOCUMENTS

| | | | |
|---|---|---|---|
| 2015/0073695 A1* | 3/2015 | Groves | G08G 1/096775 |
| | | | 701/400 |
| 2015/0211870 A1 | 7/2015 | Nickolaou | |
| 2015/0346727 A1 | 12/2015 | Ramanujam | |
| 2016/0033966 A1 | 2/2016 | Farris et al. | |
| 2017/0329346 A1* | 11/2017 | Latotzki | G05D 1/0088 |
| 2017/0345319 A1* | 11/2017 | Wang | G05D 1/106 |
| 2018/0052860 A1* | 2/2018 | Hayes | G07B 15/02 |
| 2018/0053237 A1* | 2/2018 | Hayes | G08G 1/0141 |
| 2018/0090016 A1* | 3/2018 | Nishi | B64C 39/024 |
| 2018/0135989 A1* | 5/2018 | Schreier | H04W 4/44 |
| 2018/0194343 A1* | 7/2018 | Lorenz | B60W 40/02 |
| 2018/0356814 A1* | 12/2018 | Brooks | B61L 27/0022 |
| 2019/0189008 A1* | 6/2019 | Langona | G08G 1/096791 |

* cited by examiner

PROTECTIVE ACTION FOR PROTECTING AUTONOMOUS VEHICLES FROM IMPENDING WEATHER CONDITIONS

TECHNICAL FIELD

The present invention relates to systems and methods for taking protective action, and more specifically the embodiments of a protective action system for protecting an autonomous vehicle from damage caused by impending weather conditions.

BACKGROUND

Certain weather conditions can cause damage to autonomous vehicles if the autonomous vehicles are exposed to the weather conditions.

SUMMARY

An embodiment of the present invention relates to a method, and associated computer system and computer program product, for protecting an autonomous vehicle from damage caused by impending weather conditions. A processor of a computing system detects the impending weather conditions for a geographic region, and in response to detecting the impending weather conditions, determines that an initial location of the autonomous vehicle is located in the geographic region affected by the impending weather conditions. A current risk of damage to the autonomous vehicle based on the impending weather conditions in the geographic region is and a current state of the autonomous vehicle is calculated. The current risk of damage is compared to a threshold of acceptable risk of damage, wherein, the current risk of damage exceeds a threshold of acceptable risk. A user calendar is assessed to determine that taking a protective action by the autonomous vehicle is acceptable. The autonomous vehicle is instructed to take the protective action so that the current state of the autonomous vehicle is changed to a safe state to avoid damage from the impending weather conditions.

DETAILED DESCRIPTION

Various levels of protection may be provided to autonomous vehicles by monitoring weather conditions and taking protective actions to avoid damages caused by impending weather conditions. The autonomous vehicles may be instructed to automatically take a protective action to avoid damage caused by adverse weather conditions.

Figure 1:
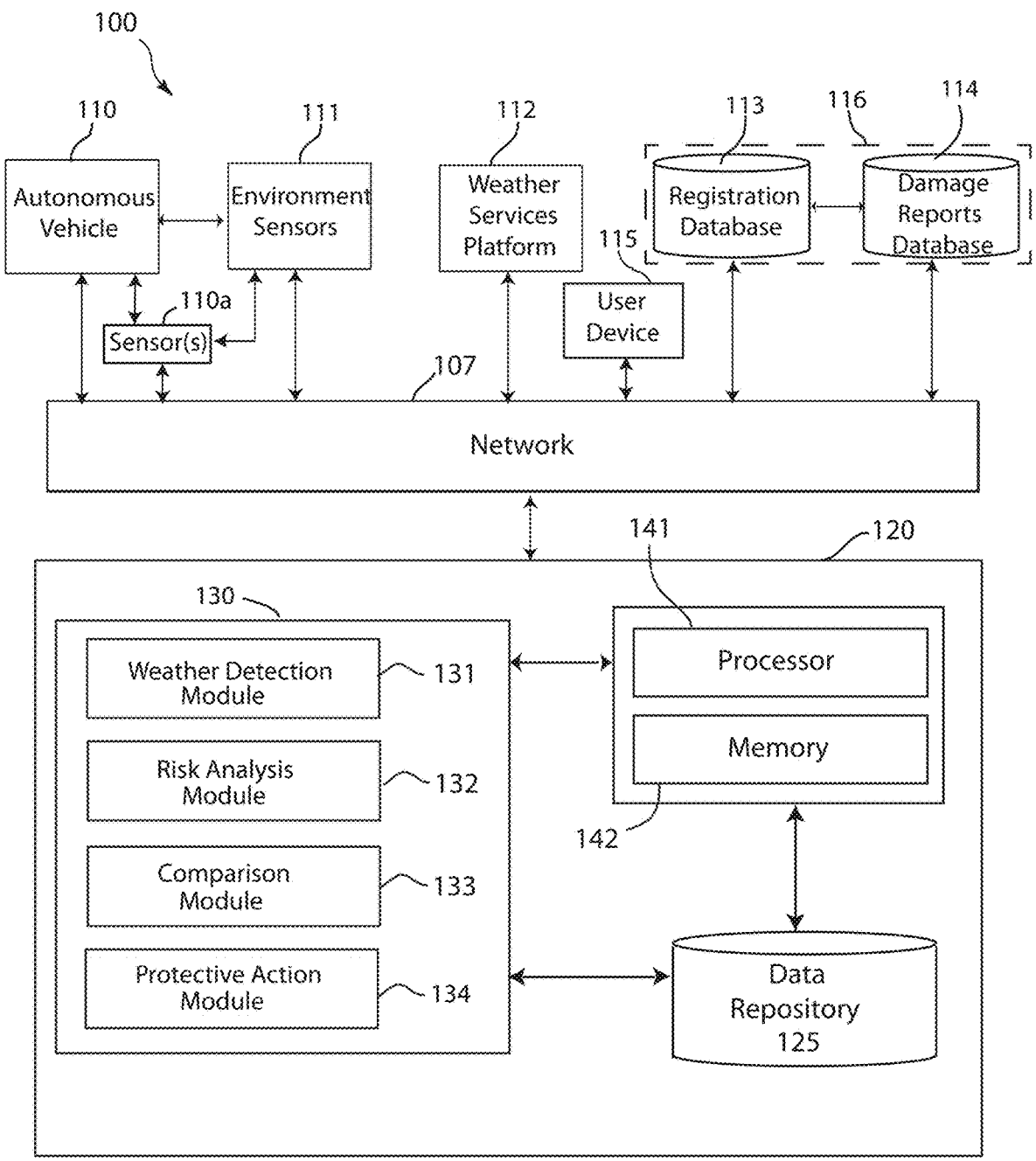
FIG. 1 depicts a block diagram of a protective action system, in accordance with embodiments of the present invention.

Referring to the drawings, FIG. 1 depicts a block diagram of protective action system 100, in accordance with embodiments of the present invention. Embodiments of the protective action system 100 may be a system for protecting an autonomous vehicle from damage caused by impending weather conditions. Embodiments of the protective action system 100 may be useful for owners/operators of autonomous vehicles to automatically protect the autonomous vehicle from damage caused by impending weather conditions. Embodiments of an autonomous vehicle as used herein may refer to a vehicle or machine that may navigate an environment without user input, such as a self-driving vehicle, self-driving car, an unmanned aerial vehicle, an unmanned surface vehicle, a drone, a robot, and the like.

Embodiments of the protective action system 100 may be a weather detection system for protecting autonomous vehicle, a weather detection system, a protective action system based on impending weather conditions, an autonomous vehicle protection system, and the like. Embodiments of the protective action system 100 may include a computing system 120. Embodiments of the computing system 120 may be a computer system, a computer, a server, one or more servers, a cloud computing device, a hardware device, a remote server, and the like.

Furthermore, embodiments of protective action system 100 may include an autonomous vehicle 110, one or more sensors 110a associated with the autonomous vehicle 110, one or more environment sensors 111, a weather services platform 112, a registration database 113, a damage reports database 114, and a user device 115, communicatively coupled to a computing system 120 of the protective action system 100 over a network 107. For instance, information/data may be transmitted to and received from the autonomous vehicle 110, the one or more sensors 110a associated with the autonomous vehicle 110, the one or more environment sensors 111, the weather services platform 112, the registration database 113, the damage reports database 114, and the user device 115 over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases (not shown) containing information of the autonomous vehicle, user calendar history, weather reports, damage reports, network repositories or other systems connected to the network 107 that may be considered nodes of the network 107. In some embodiments, where the computing system 120 or network repositories allocate resources to be used by the other nodes of the network 107, the computing system 120 and network repository may be referred to as servers.

The network repository may be a data collection area on the network 107 which may back up and save all the data transmitted back and forth between the nodes of the network 107. For example, the network repository may be a data center saving and cataloging information of the autonomous vehicle, user calendar history, weather reports, damage reports, and the like, to generate both historical and predictive reports regarding a potential damaging condition for an autonomous vehicle. In some embodiments, a data collection center housing the network repository may include an analytic module capable of analyzing each piece of data being stored by the network repository. Further, the computing system 120 may be integrated with or as a part of the data collection center housing the network repository. In some alternative embodiments, the network repository may be a local repository that is connected to the computing system 120.

Embodiments of the autonomous vehicle 110 of the protective action system 100 may be a vehicle, machine, transportation device, an aerial vehicle, an unmanned autonomous vehicle (UAV), an unmanned autonomous surface vehicle, an unnamed autonomous aerial vehicle, a self-driving car, a self-driving vehicle, a self-driving truck or other motor vehicle, a battery powered self-driving vehicle, a hybrid autonomous vehicle, a drone for delivering packages, a recreational drone, a military drone, and the like. Embodiments of the autonomous vehicle 110 may connect to or otherwise communication with the computing system 120 over network 107. Embodiments of the autonomous vehicle 110 may include an onboard computer, microcontroller, processor, GPS sensors, cameras, microphones, transmitters, receivers, and other hardware for carrying out one or more functions of an autonomous vehicle, such as at least one wheel, a power source, at least one wing, at least one rotary blade, etc. Moreover, embodiments of the protective action system 100 may include one or more sensors 110a associated with the autonomous vehicle 110. Embodiments of the one or more sensors 110a may be integrated, linked, paired, etc. to the autonomous vehicle 110, such as a sensor, a GPS unit, a peripheral device, a camera, a microphone, an accelerometer, and other sensors that may be useful for capturing data pertaining to a current state of the autonomous vehicle 110. Although the protective action system 100 in FIG. 1 depicts a single sensor 110a, embodiments of the protective action system 100 may include more than one sensors 110a, that may be integrated with or otherwise paired with the autonomous vehicle 110, as well as with each other. The number of sensors 110a connecting to computer system 120 over network 107 may vary from embodiment to embodiment.

Furthermore, embodiments of the protective action system 100 may include one or more environment sensors 111. Embodiments of environment sensors 111 may be an input mechanism, a sensor, an input mechanism, and the like, which may collect, capture, obtain, etc. data associated with the autonomous vehicle 110 and/or an environment surrounding the autonomous vehicle 110. Embodiments of the environment sensor 111 may be placed in and around a known environment of the autonomous vehicle 110, such as a garage structure or covered parking area. Embodiments of the environment sensors 111 may be a camera, a microphone, an infrared sensor, a temperature sensor, a thermal sensor, a weight sensor, a light sensor, a GPS sensor, an internet connectable sensor, and the like. As described in greater detail infra, embodiments of the environment sensors 111 may be helpful in determining a current state of the autonomous vehicle 110 within an environment.

Referring still to FIG. 1, embodiments of the weathering services platform 112 of the protective action system 100 may be one or more databases, storage devices, repositories, servers, computers, engines, websites, programs, applications, and and/or a combination thereof, that may service, run, etc. a weather forecast and weather news outlet, such as a weather data center, a weather services application, a weather information and prediction website, a weather map source, and the like, or that may contain weather information (e.g. models, radar data, current temperatures, precipitation values, forecasts, etc.). The weathering services platform 112 may be accessed or may share a communication link over network 107, and may be managed and/or controlled by a third party, such as a weather prediction, forecasting, and reporting services company, and the like. In an exemplary embodiment, the weather services platform 112 may be used for weather forecast input for detecting impending weather conditions, as described in greater detail infra. Aspects of the weather services platform 112 may be accessible by the computing system 120, and the user device 110. Embodiments of the weather services platform 112 may also be coupled to the user device 110.

Embodiments of the protective action system 100 may include a user device 115. Embodiments of the user device 115 may be a user device, a cell phone, a smartphone, a user mobile device, a mobile computer, a tablet computer, a PDA, a smartwatch, a dedicated mobile device, a desktop computer, a laptop computer, or other internet accessible device, machine, or hardware. The computing system 120 may connect (e.g. over a network) to a calendaring application for assessing, checking, viewing, analyzing, etc. one or more calendars or schedules of the user. The user device 115 may be running one or more calendar or scheduling applications associated that may allow the computing system 120 access to a user calendar.

Embodiments of the protective action system 100 may also include a common repository 116. Embodiments of the common repository 116 may be a central database, repository, storage medium, and the like, which may be accessible by the computing system 120 over network 107. In some embodiments, the common repository 116 may be a local storage medium of the computing system 120, such as data repository 125. Embodiments of the common repository 116 may include a registration database 113 and a damage reports database 114 as part of the common repository 116. Embodiments of the registration database 113 may be may be one or more databases, storage devices, repositories, and the like, that may store or otherwise contain information and/or data regarding registration information, including autonomous vehicle data, autonomous vehicle identification information, protective action capabilities of each registered autonomous vehicle, a risk tolerance rating for each autonomous vehicle needing protection, identification and access information of sensors 110a associated with the autonomous vehicle 110, user information, user calendar information, user password information associated with an account or profile stored on the registration database 113, GPS or satellite receiver links/information, and the like. For instance, a user may register one or more autonomous vehicles 110 with the protective action system, wherein the registration information may be stored on the registration database 113, which is accessible by the computing device 120. The registration database 113 may include information regarding a protective action capability of the autonomous vehicle 110. A protective action capability may refer to a protective action a particular autonomous vehicle 110 may be able to perform to change from a current state where the autonomous vehicle 110 is vulnerable to weather damage to a state where the autonomous vehicle 110 is not vulnerable to weather damage. In a first example, an autonomous vehicle may have automatic windows, wherein in the event that windows are left open during a rain storm, the windows can be automatically closed, in accordance with embodiments of the present invention. In a second example, an autonomous vehicle may be able to self-drive on roads from a first location to a second location, wherein in the event that the autonomous vehicle needs to move from an uncovered, unprotected state to a covered, protected state to avoid adverse weather conditions, the autonomous vehicle may automatically drive to a safe haven location, such as a covered parking spot. In a third example, an autonomous vehicle may be able to fly without human real-time input from a first location to a second location, wherein in the event that the autonomous vehicle needs to move from an uncovered, unprotected state to a covered, protected state to avoid adverse weather conditions, the autonomous vehicle may automatically fly to a safe haven location, such as a covered landing spot. Each protective action capability for each registered autonomous vehicle 100 may be stored on the registration database 113 or common repository 116, which may be accessed by the computing system 120 over the network 107 for determining which protective action to take, as described in greater detail infra.

Furthermore, a user may register or otherwise provide a risk tolerance of damage associated with each registered autonomous vehicle 100, which may be stored on the registration database 113. A risk tolerance of damage may be an acceptable amount of risk the user/owner of the autonomous vehicle 110 may be willing to take with respect to potential damage to the autonomous vehicle 110. In some cases, the acceptable risk tolerance of damage may be very low to none for an autonomous vehicle 110 that is very expensive or is susceptible to damage from any contact with an environmental element, such as water. In other cases, the acceptable risk tolerance may be a medium risk level, for an autonomous vehicle 110 that has weather resistant features, such that water or moisture is unlikely to cause damage, but is susceptible to strong winds. In yet another case, the acceptable risk tolerance of damage may be very high for an autonomous vehicle 110 that has a rigid exterior that is less susceptible to winds and rain, but is susceptible to aesthetic damage from hail, for example. Accordingly, an acceptable risk of damage may vary from user-to-user and from autonomous vehicle-to-autonomous vehicle. A threshold of acceptable risk may be calculated based on the provided risk tolerances for each autonomous vehicle 110. Embodiments of the acceptable risk of damage threshold may be embodied as a number, a value, a score, a grade, a percentage risk, and the like, which may be stored in the registration database 113 and/or common repository 116. The acceptable risk tolerance may be used in trade-off analytics when determining whether to take protective action.

Embodiments of the common repository 116 may also include the damage reports database 114. Embodiments of the damage reports database 114 may be may be one or more databases, storage devices, repositories, and the like, that may store or otherwise contain information and/or data regarding weather damage to autonomous vehicles, including autonomous vehicle damage probabilities, previous reports of damage, structural weaknesses and/or known weather risks, weather damage probabilities, historical data regarding known weather damage to particular autonomous vehicles, and the like. Embodiments of the damage reports database 114 may be accessed to determine a historical damage probability to the autonomous vehicle based on weather conditions similar to the impending weather conditions. For instance, if impending weather conditions are detected for a region that the autonomous vehicle 110 is located, a current risk of damage may be calculated that takes into account historical probability data that the impending weather conditions may cause damage to the particular autonomous vehicle 110. The damage reports database 114 may be accessed by the computing system 120 over network 120, and may be supplied with damage report information from a manual input of a reported damage to a particular autonomous vehicle, an insurance company reference from a claim being made on an autonomous vehicle that suffered a weather damage, and/or sensor data reporting malfunctions, damage, structural damage, etc. from a weather condition, from all registered autonomous vehicles of all uses, as well as non-registered vehicles. The damage reports may be provided by sensors and similar devices in a learning loop top determine risk based on the historical damage captured by the sensors/devices to constantly update and/or improve the current risk calculations.

Further, embodiments of the computing system 120 may be equipped with a memory device 142 which may store various data/information/code, and a processor 141 for implementing the tasks associated with the protective action system 100. In some embodiments, a protective action application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the protective action application 130. Embodiments of the protective action application 130 may be an interface, an application, a program, a module, or a combination of modules. In an exemplary embodiment, the protective action application 130 may be a software application running on one or more servers, servicing multiple computing devices, autonomous devices, user devices, etc.

Referring still to FIG. 1, embodiments of the protective action application 130 of the computing system 120 may include a weather detection module 131, a risk analysis module 132, a comparison module 133, and a protective action module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the weather detection module 131 may include one or more components of hardware and/or software program code for detecting impending weather conditions for a geographic region. For instance, embodiments of the weather detection module 131 may access, utilize, or otherwise use the weather services platform 112 to detect impending weather conditions approaching the geographic region. Embodiments of impending weather conditions may be an upcoming or approaching thunderstorm, rain shower, snow storm, snow fall, gusty winds, high humidity, hail, hurricane, tornado, flood, dry weather, hot temperatures, low temperatures, and the like, which may be capable of adversely affecting and/or damaging the autonomous vehicle 110. Embodiments of the weather detection module 131 may continuously monitor activity, data, forecasts, models, radar data, weather sensors, etc. associated with the weather services platform 112 to predict and/or detect impending weather conditions for a particular geographic region. Further, embodiments of the weather detection module 131 may also communicate with the environment sensors 111 positioned nearby the autonomous vehicle to obtain a more precise environmental condition, such as pressure, humidity, moisture, wind speed, etc. that may be used in combination with the data received from the weather services platform 112. Embodiments of the weather detection module 131 may predict or otherwise detect impending weather conditions, which are only represented as a probability to occur, as well as an expected time of arrival of the impending weather conditions.

In response to detecting, or during the monitoring of, the impending weather conditions, embodiments of the weather detection module 131 may determine that an initial location of the autonomous vehicle 110 is located in the geographic region affected by the impending weather conditions. For instance, embodiments of the weather detection module 131 may scan, search, or otherwise identify each autonomous vehicle 110 that may be located in an area that may be impacted by the weather conditions. In an exemplary embodiment, the weather detection module 131 may continuously monitor the location of the autonomous vehicles 110 simultaneously with the continuous monitoring of the weather services platform 112 to reduce a time between detecting the impending weather conditions and the locations of the autonomous vehicles 110. Embodiments of the weather detection module 131 of the computing system 120 may receive location-based information from one or more sensors 110a to determine a location of the autonomous vehicle 110 in a particular geographic region that may be predicted or expected to experience impending weather conditions.

Embodiments of the computing system 120 may further include a risk analysis module 132. Embodiments of the risk analysis module 132 may include one or more components of hardware and/or software program code for calculating a current risk of damage to the autonomous vehicle 110 based on the impending weather conditions in the geographic region and a current state of the autonomous vehicle 110. For instance, embodiments of the risk analysis module 132 may analyze a historical damage probability that the autonomous vehicle 110 may be damages based on weather conditions similar to the impending weather conditions. In an exemplary embodiment, the risk analysis module 132 may analyze the current weather conditions and/or the conditions of the detected weather event for cross-referencing with weather conditions in the past that may be similar. Using a similarity of the weather conditions, the risk analysis module 132 may be able to analyze historical data to determine a current risk of damage based on the impending weather conditions. For example, embodiments of the risk analysis module 132 may query or otherwise access the damage reports database 114 to perform a comparison between past weather events to the impending weather event, to receive damage results for various autonomous vehicles. In addition, the risk analysis module 132 may query or otherwise access the registration database 113 to determine more information about the autonomous vehicles 110 that are located in the geographic region of the impending weather conditions, such as model number, material of frame, electronics onboard, etc. Accordingly, embodiments of the risk module 132 may calculate a current risk of damage to a particular autonomous vehicle 110. In a first example, the risk analysis module 132 may determine that a model number "X" of a UAV has experienced weather damage from winds exceeding 25 mph, and thus may conclude that a risk of damage may be high if the impending weather conditions are predicted to include winds over 55 mph. In a second example, the risk analysis module 132 may determine that a model number "XX" of a self-driving car has experienced weather damage from rainfall measuring over 2 inches per hour, and thus may conclude that a risk of damage may be of medium risk if the impending weather conditions are predicted to include only 1 inch of rain per hour. In a third example, the risk analysis module 132 may determine that a model number "Y" of a self-driving car has no reported weather damage from high levels of humidity, thus may conclude that a risk of damage may be very low if the impending weather conditions are predicted to include dry weather for long period of time. The probability that a weather event occur may also factor in to the analysis of the current risk of damage. For example, if the probability of a snow storm is given 90% probability to occur, then the risk analysis module 131 may be more likely to conclude that a current risk is higher than is the snow storm is given a 10% probability to occur.

Embodiments of the risk analysis module 132 may also consider a current state of the autonomous vehicle 110 before completing a calculation of current risk of damage. A current state of the autonomous vehicle 110 may be a protected state, an unprotected state, a sheltered state, an unsheltered state, a covered state, an uncovered state, a grounded state, an airborne state, a traveling state, a safe state, an unsafe state, a static state, a shielded state, an unshielded state, an open state, a closed state, and the like. The current state of the autonomous vehicle 110 may be categorized as either protected or safe from damage caused by a weather condition or unprotected or unsafe from damage caused by a weather condition. Embodiments of the risk analysis module 132 may determine the current state of the autonomous vehicle 110 by analyzing sensor data from one or more sensors 110a associated with the autonomous vehicle and/or one or more environmental sensors 111 positioned in an environment of the autonomous vehicle 110.

Figure 2:
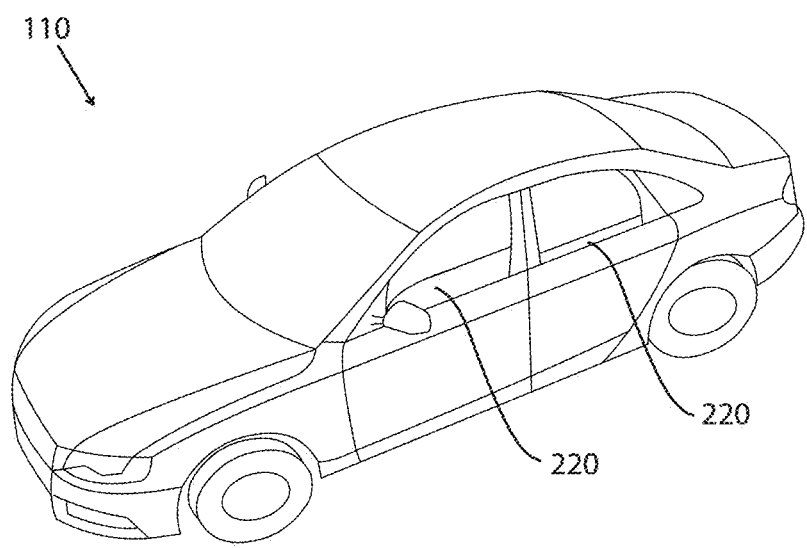
FIG. 2 depicts a first autonomous vehicle, wherein a current state of the first autonomous vehicle is an unprotected state, in accordance with embodiments of the present invention.

Turning now to FIG. 2, which depicts a first autonomous vehicle 110, wherein a current state of the autonomous vehicle is an unprotected state, in accordance with embodiments of the present invention. Here, one or more sensors 110a of the autonomous vehicle 110 have transmitted data to the computing system 120 which indicates that the current state of the autonomous vehicle is not protected. For example, a camera inside the autonomous vehicle 110 may be sending a feed of two open windows 220 of the autonomous vehicle 110, as well as an onboard computer of the autonomous vehicle 110 confirming that one or more windows 220 are open. Because the windows 220 are open, the autonomous vehicle 110 may be susceptible to damage from weather, such as rain water entering an interior of the vehicle 110. Based on the sensor data, the risk analysis module 132 may conclude that a current state of the autonomous vehicle 110 is an unprotected state.

Figure 3:
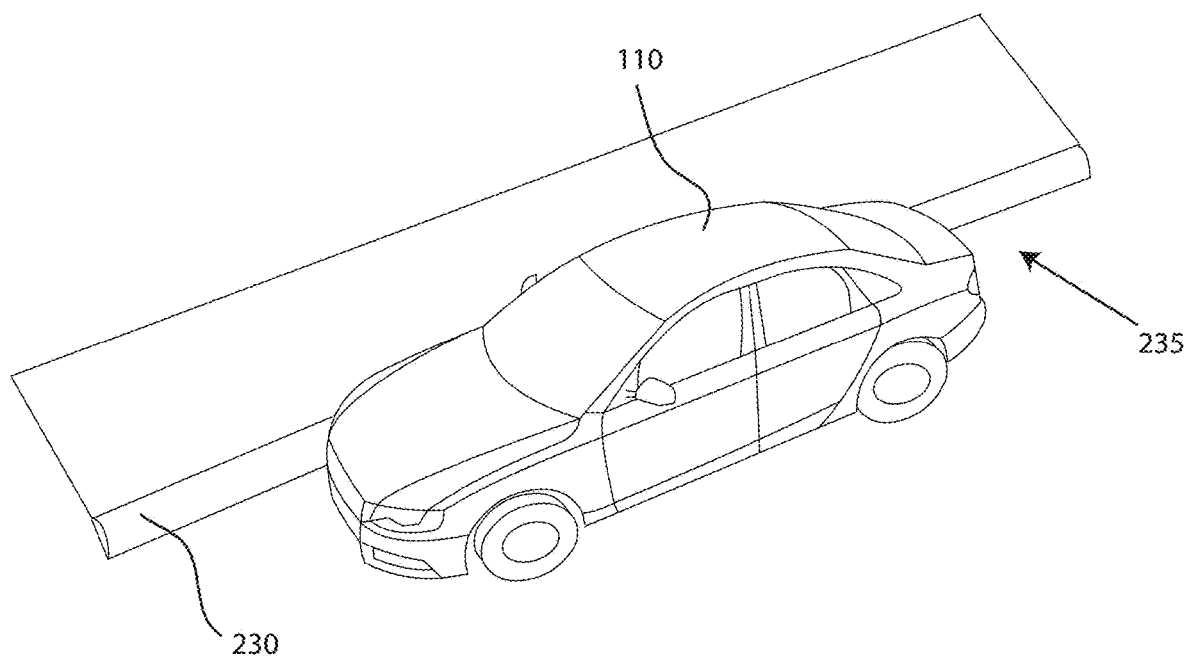
FIG. 3 depicts a second autonomous vehicle, wherein a current state of the second autonomous vehicle is an unprotected state, in accordance with embodiments of the present invention.

FIG. 3 depicts a second autonomous vehicle 110, wherein a current state of the autonomous vehicle is an unprotected state, in accordance with embodiments of the present invention. Here, one or more sensors 110a of the autonomous vehicle 110 have transmitted data to the computing system 120 which indicates that the current state of the autonomous vehicle is not protected. For example, a camera outside the autonomous vehicle 110 may be sending a feed of a curb 230 and road 235 on the sides of the autonomous vehicle 110, as well as an onboard computer of the autonomous vehicle 110 confirming that the vehicle 110 is parked. Because the autonomous vehicle 110 is parked on a side of the road 235, the autonomous vehicle 110 is not likely sheltered from weather elements and could pose a problem for snow removal, for example after/during a snow storm. Based on the sensor data, the risk analysis module 132 may conclude that a current state of the autonomous vehicle 110 is an unprotected state.

Figure 4:
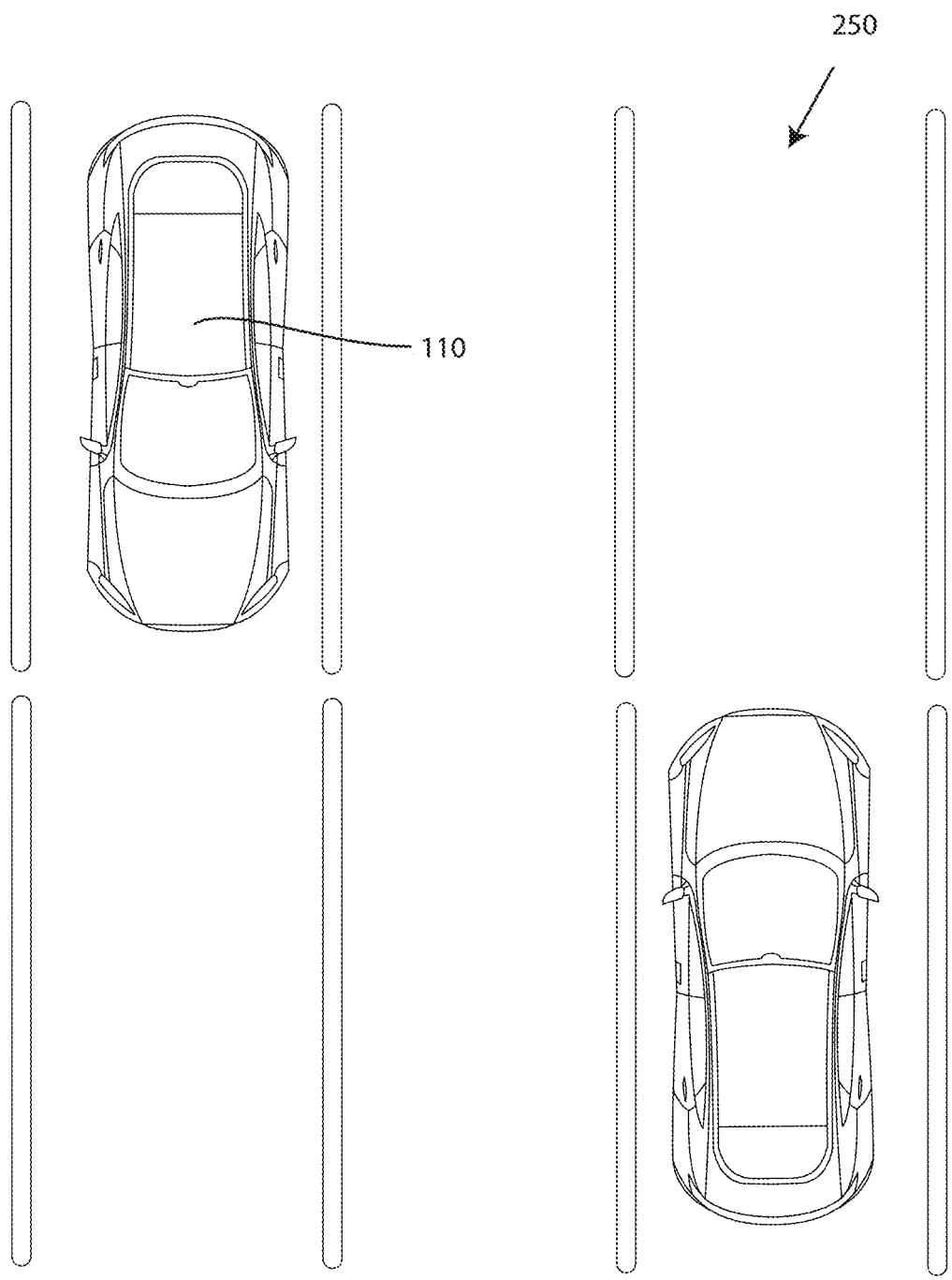
FIG. 4 depicts a third autonomous vehicle, wherein a current state of the third autonomous vehicle is an unprotected state, in accordance with embodiments of the present invention.

FIG. 4 depicts a third autonomous vehicle 110, wherein a current state of the autonomous vehicle is an unprotected state, in accordance with embodiments of the present invention. Here, one or more sensors 110a of the autonomous vehicle 110 have transmitted data to the computing system 120 which indicates that the current state of the autonomous vehicle is not protected. For example, a GPS unit is transmitting a current location of the autonomous vehicle 110 that is associated with a well-known parking lot 250, as well as an onboard computer of the autonomous vehicle 110 confirming that the vehicle 110 is parked. Because the autonomous vehicle 110 is parked in a parking lot 250, the autonomous vehicle 110 is not likely sheltered from weather elements and could take damage from the weather elements, such as hail during a hail storm. Based on the sensor data, the risk analysis module 132 may conclude that a current state of the autonomous vehicle 110 is an unprotected state.

Figure 5:
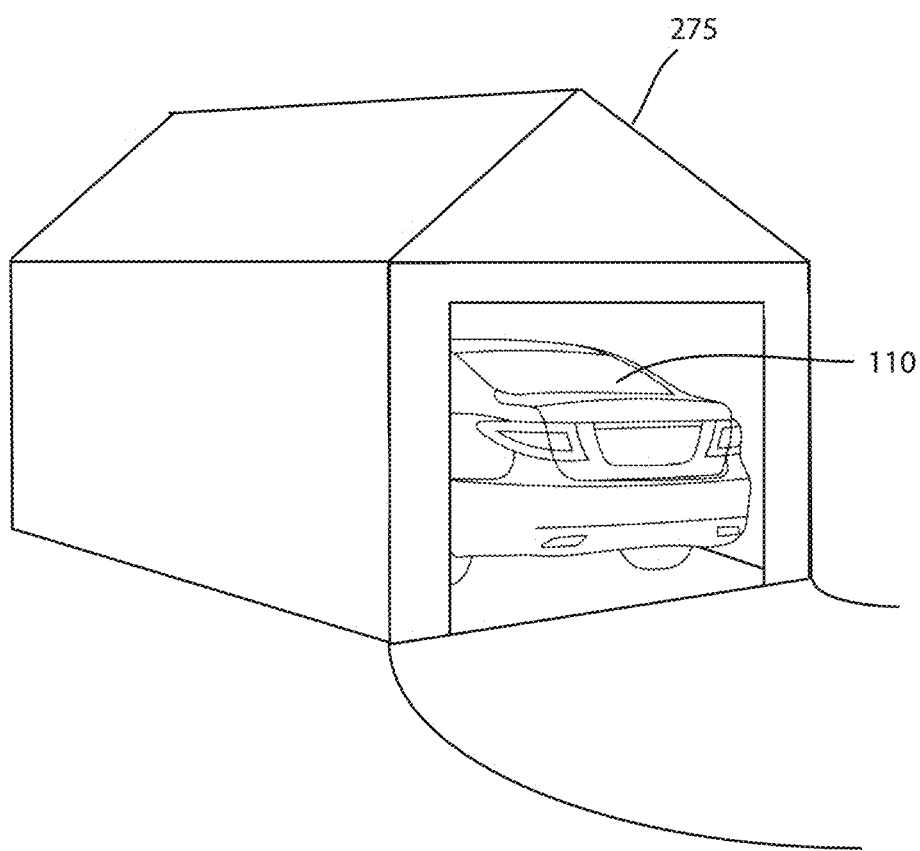
FIG. 5 depicts a fourth autonomous vehicle, wherein a current state of the fourth autonomous vehicle is a protected state, in accordance with embodiments of the present invention.

FIG. 5 depicts a fourth autonomous vehicle 110, wherein a current state of the fourth autonomous vehicle is a protected state, in accordance with embodiments of the present invention. Here, one or more sensors 110a of the autonomous vehicle and environmental sensors 111 have transmitted data to the computing system 120 which indicates that the current state of the autonomous vehicle is protected. For example, a GPS unit is transmitting a current location of the autonomous vehicle 110 that is associated with a safe haven location, a light sensor is determining that the autonomous vehicle 110 is covered, sheltered, enclosed, or otherwise protected by a shelter 275 (e.g. garage, car port, parking garage, heavy tree coverage, and the like), as well as an onboard computer of the autonomous vehicle 110 confirming that the vehicle 110 is parked. Because the autonomous vehicle 110 is parked or stored within the shelter 275, the autonomous vehicle 110 is likely sheltered or protected from weather elements and will not likely take damage from the weather elements. Based on the sensor data, the risk analysis module 132 may conclude that a current state of the autonomous vehicle 110 is a protected state.

Accordingly, the current state of the autonomous vehicle 110 may affect the current risk of damage calculation. A determination or conclusion that the current state of the autonomous vehicle 110 is an unprotected or only partially protected state may result in an increase to a risk factor in the calculation of the current risk of damage to the autonomous vehicle 110. However, a determination or conclusion that the current state of the autonomous vehicle 110 is a protected state may result in a decrease to a risk factor in the calculation of the current risk of damage to the autonomous vehicle 110. In an exemplary embodiment, a determination that the autonomous vehicle 110 is in a protected state may reduce the current risk of damage to zero. In other embodiments, a determination that the current state is a protected state may also include an analysis of a degree of protection. For example, a heavy tree coverage may result in a protected state, but may not be as effective as a protection element as an enclosed garage. Further, a degree of protection may be based on a severity of the impending weather conditions. For example, if heavy tree coverage may protect against light rain showers, it may not necessarily protect against a hail storm. Thus, embodiments of the risk analysis module 132 may consider the current state of the autonomous vehicle 110 and the historical data and probability that damage may occur based on the impending weather conditions. Embodiments of the current risk of damage may be embodied as a number, a value, a score, a grade, a percentage risk, and the like, which may be stored in the registration database 113 and/or common repository 116 in response to being calculated by the risk analysis module 132.

Referring back to FIG. 1, embodiments of the computing system 120 may include a comparison module 133. Embodiments of the comparison module 133 may include one or more components of hardware and/or software program code for comparing the current risk of damage to a threshold of acceptable risk of damage. For instance, embodiments of the comparison module 133 may query or otherwise access the registration database 113 to retrieve or otherwise obtain the threshold of acceptable risk. Embodiments of the acceptable risk may be provided by the user, and may be calculated based on a user input risk and a historical analysis of probability of damage to occur. The comparison module 133 may determine whether the current risk of damage calculated by the risk analysis module 132 exceeds the threshold of acceptable risk. If the current risk of damage does not exceed the threshold of acceptable risk, then the comparison module 133 may determine that no protective action should be taken.

If the current risk of damage exceeds a threshold of acceptable risk, then the comparison module 133 may assess, check, review, analyze, etc. a user calendar to determine that taking a protective action by the autonomous vehicle 110 is acceptable. For instance, embodiments of the comparison module 133 may query or otherwise access the registration database 113 to retrieve or otherwise obtain a calendaring information of the user. Alternatively, the comparison module 133 may communicate over network 107 with the user device 115 to retrieve calendar/scheduling data. Embodiments of the comparison module 133 may review, analyze, check, ascertain, etc. the user calendar to determine that the user has not planned to use the autonomous vehicle 110 or needs to use the autonomous vehicle 110. The comparison module 133 may infer from the calendaring data that the user has planned to use the autonomous vehicle 110 or needs to the use the autonomous vehicle 110. For example, if the comparison module 133 detects that the user device 115 of the user is located at a work location at certain time of day, and the comparison module 133 notices that the user has to take the user's daughter to the airport in 15 minutes, the comparison module 133 may determine that taking a protective action within the next 15 minutes (e.g. moving the vehicle 110 to a safe haven location) may be unacceptable to the user because the user will not have the ability to use the autonomous vehicle 110. Therefore, embodiments of the comparison module 133 may cross-reference a user calendar to verify that a timing for a protective action is acceptable. In other words, the comparison module 133 may determine that taking a protection action with the autonomous vehicle 110 may not create a conflict with a user's need or plan to use the autonomous vehicle 110.

Referring again to FIG. 1, embodiments of the computing system 120 may include a protective action module 134. Embodiments of the protective action module 134 may include one or more components of hardware and/or software program code for instructing the autonomous vehicle 110 to take the protective action so that the current state of the vehicle 110 is changed to a safe state to avoid damage from the impending weather conditions and/or environmental conditions. For instance, embodiments of the protective action module 134 may determine one or more protective actions to take based on the current risk of damage and the current state of the autonomous vehicle 110, to change the current state of the autonomous vehicle 110 to the safe state. Embodiments of a protective action may include closing a window, locking a door, landing a drone, driving to a shelter 275, find nearest safe haven and move towards the safe haven, fly to shelter, moving to higher ground to avoid a flood, driving to higher ground, and the like. Embodiments of the protective action module 134 may automatically proceed with the instructions, or may send a communication to the user device 115 to approve a protective action recommended by the protective action module 134.

Figure 6:
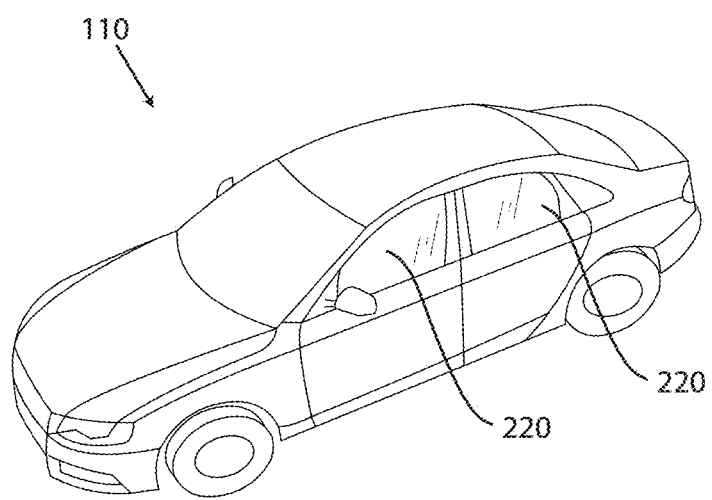
FIG. 6 depicts the first autonomous vehicle of FIG. 2 that has taken a protective action to avoid damage from impending weather conditions, in accordance with embodiments of the present invention.

FIG. 6 depicts the first autonomous vehicle of FIG. 2 that has taken a protective action to avoid damage from impending weather conditions, in accordance with embodiments of the present invention. Here, the protection action module 134 has instructed the autonomous vehicle 110 to close the windows 220 to avoid damage from impending weather conditions. By closing the windows, the current state of the autonomous vehicle 110 has been changed to a protected state, and an updated current risk of damage has been significantly reduced and/or eliminated altogether.

Figure 7:
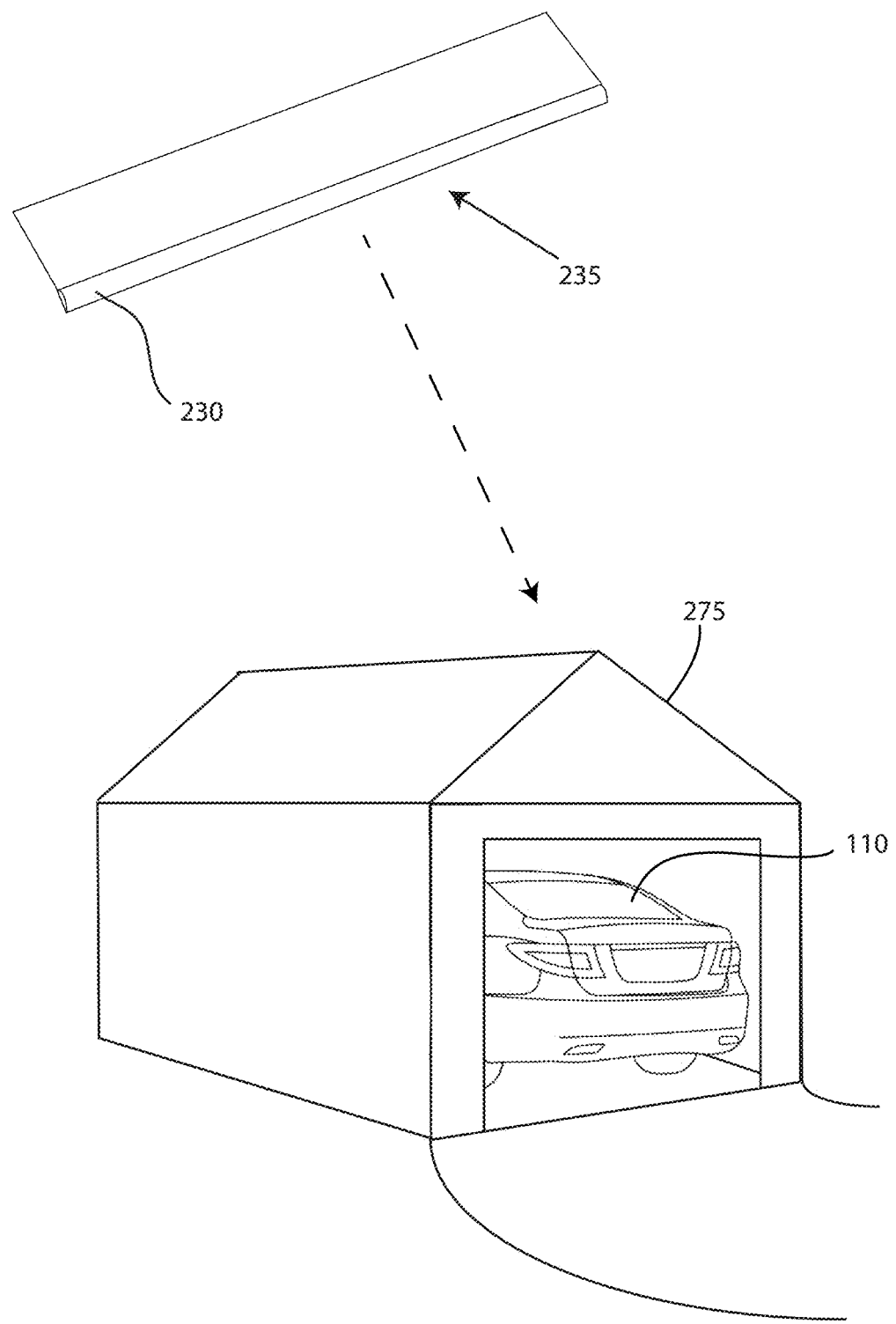
FIG. 7 depicts the second autonomous vehicle of FIG. 3 that has taken a protective action to avoid damage from impending weather conditions, in accordance with embodiments of the present invention.

FIG. 7 depicts the second autonomous vehicle of FIG. 3 that has taken a protective action to avoid damage from impending weather conditions, in accordance with embodiments of the present invention. Here, the protection action module 134 has instructed the autonomous vehicle 110 to drive to a shelter 275 from the curbside 230 location near the road 230 to avoid damage from impending weather conditions. By driving to the shelter 275, the current state of the autonomous vehicle 110 has been changed to a protected state, and an updated current risk of damage has been significantly reduced and/or eliminated altogether.

Figure 8:
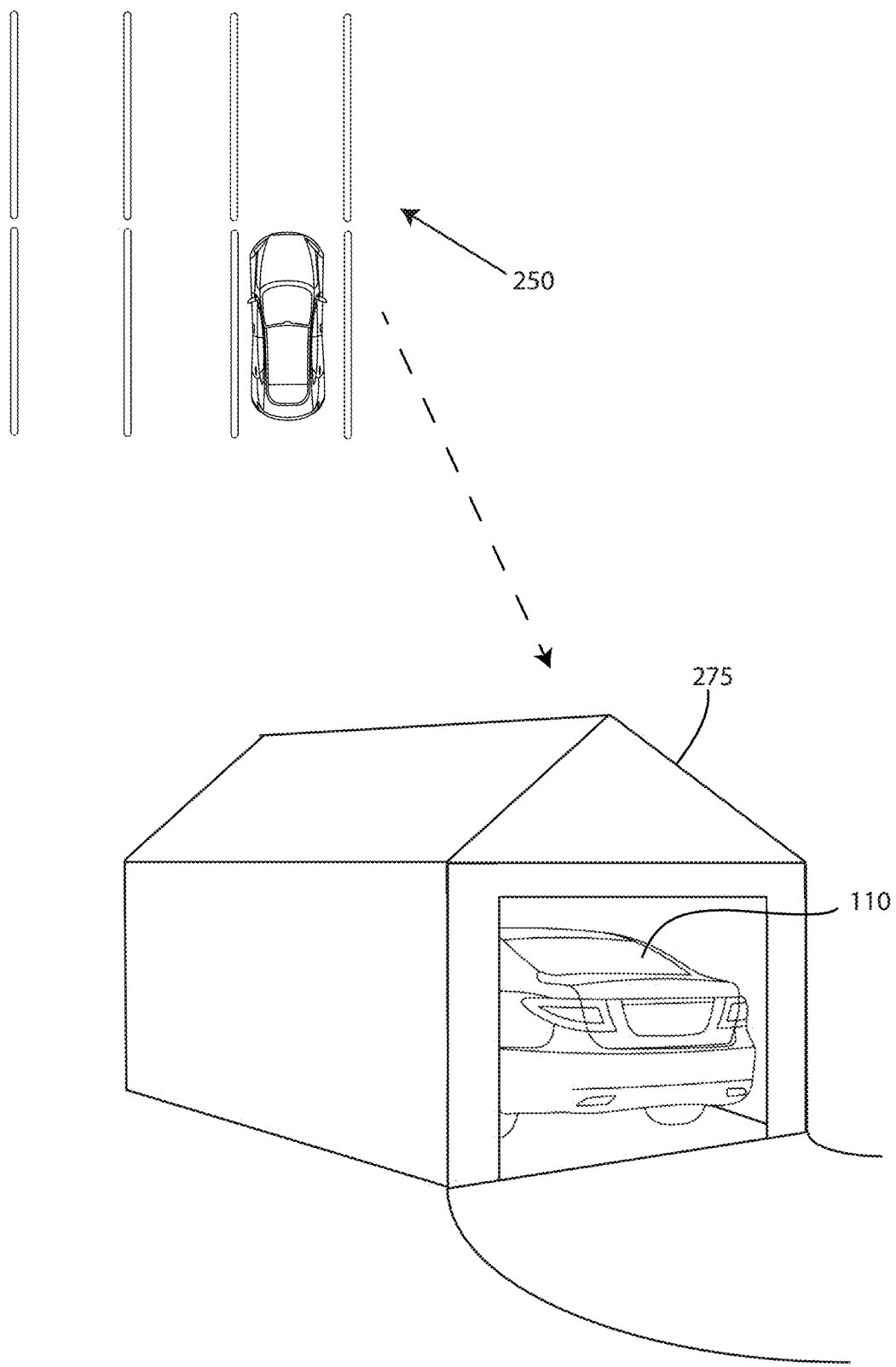
FIG. 8 depicts the third autonomous vehicle of FIG. 4 that has taken a protective action to avoid damage from impending weather conditions, in accordance with embodiments of the present invention.

FIG. 8 depicts the third autonomous vehicle of FIG. 4 that has taken a protective action to avoid damage from impending weather conditions, in accordance with embodiments of the present invention. Here, the protection action module 134 has instructed the autonomous vehicle 110 to drive to a shelter 275 from the exposed parking lot 250 to avoid damage from impending weather conditions. By driving to the shelter 275, the current state of the autonomous vehicle 110 has been changed to a protected state, and an updated current risk of damage has been significantly reduced and/or eliminated altogether.

Embodiments of the protective action module 134 may perform a search of all potential locations that may provide shelter or protection from impending weather conditions, for assisting the autonomous vehicle 110 find protection. For example, embodiments of the protective action module 134 may query the common repository 116 for known safe havens within a proximity to the autonomous vehicle 110. Further, embodiments of the protective action module 134 may search and locate public locations that may provide protection, such as a covered parking garage. Embodiments of the protective action module 134 may purchase a ticket and/or reservation for the autonomous vehicle 110 (e.g. from the parking garage) ahead of time so that the autonomous vehicle 110 may successfully be able to avoid damage to impending weather conditions.

Moreover, embodiments of the protective action module 134 may continuously monitor a time required to achieve the safe state/protected state from the current state for determining a time to instruct the autonomous vehicle to take the protective action. For instance, each protective action may require various time to completion, and the protective action module 134 may monitor and continuously calculate that time to completion for ideal instructing of the autonomous vehicle 110. In a first example, closing windows 220 of a vehicle 110 may take a matter of seconds. In a second example, driving from a curbside 230 location to a shelter 275 may take minutes, hours, etc., and may be affected by traffic and other factors. Thus, embodiments of the protective action module 134 may monitor traffic programs, map/directions applications, etc. to compute a time to safe status, which may be used to time an instruction to the autonomous vehicle 110 to initiate a protective action.

Referring back to FIG. 1, embodiments of the protective action module 134 may disengage protective actions after a risk of damage to impending weather conditions and environmental conditions is reduced sufficiently. In particular, embodiments of the protective action module 134 may instruct the autonomous vehicle 110 to return to the current state (e.g. state prior to protective action), in response to calculating an updated risk of damage based on a current weather condition and environmental conditions, that is below the threshold of acceptable risk of damage. The updated risk of damage may be calculated in the same or substantially the same manner as the current risk of damage as described supra. However, the calculating the updated risk of damage may further include an analysis of resultant environmental conditions in addition to weather conditions. For example, if the raining has stopped, there may be flooded regions that may not permit a return to the initial location of the current state. Embodiments of the resultant environmental condition may include a flood, downed power lines, fallen trees, power outage, and other damages or obstacles that may be a result of the impending weather conditions. Likewise, the updated risk of damage may be compared to the threshold of acceptable risk as contained in the registration database 113, for example. If the updated risk is below the threshold of acceptable risk, embodiments of the protective action module 134 may instruct the autonomous vehicle 110 to return to the initial location and/or the initial state of the autonomous vehicle 110. Further, embodiments of the protective action module 134 may continuously monitor a time required to return to the current state and/or initial location from the safe state for determining an ideal time to instruct the autonomous vehicle to return to the current state.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the protective action system 100 may improve the autonomous vehicle industry by offering a method to conserve computer resources by determining ideal times to find a protected location as well as extending a shelf life of the autonomous vehicle by automatically causing or instructing the autonomous vehicle to take physical protective actions, utilizing hardware and sensor devices to intelligently determine physical positions, locations, states of protection, and the like.

Figure 9:
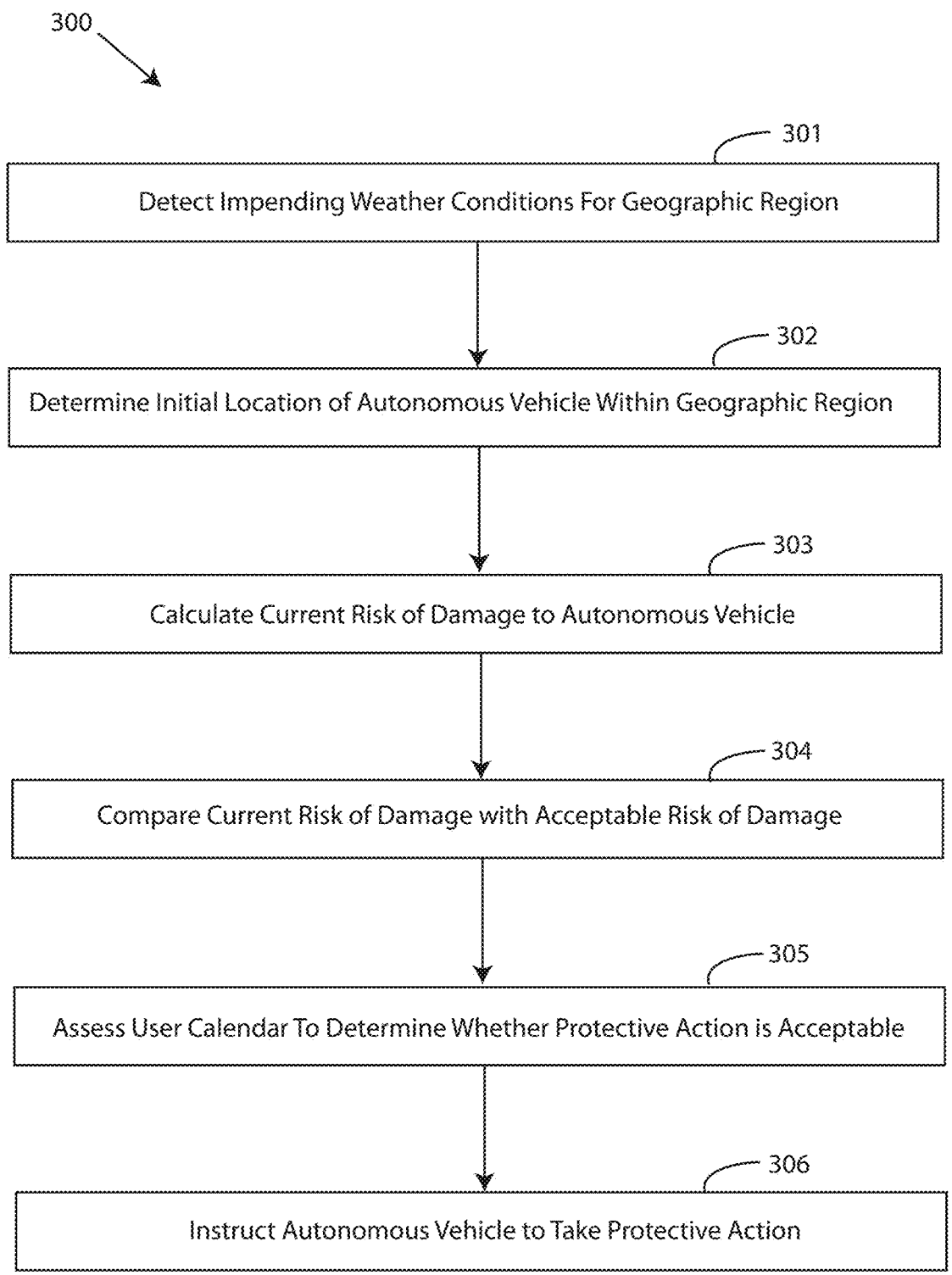
FIG. 9 depicts a flow chart of a method for protecting an autonomous vehicle from damage caused by impending weather conditions, in accordance with embodiments of the present invention.

Referring now to FIG. 9, which depicts a flow chart of a method 300 for protecting an autonomous vehicle from damage caused by impending weather conditions, in accordance with embodiments of the present invention. One embodiment of a method 300 or algorithm that may be for protecting an autonomous vehicle from damage caused by impending weather conditions with the protective action system 100 described in FIGS. 1-8 using one or more computer systems as defined generically in FIG. 11 below, and more specifically by the specific embodiments of FIG. 1.

Embodiments of the method 300 for protecting an autonomous vehicle from damage caused by impending weather conditions, in accordance with embodiments of the present invention, may begin at step 301 wherein impending weather conditions are detected for a geographic region. Step 302 determines an initial location of the autonomous vehicle 110 within the geographic region. Step 303 calculates a current risk of damage to the autonomous vehicle 110. Step 304 compares the current risk of damage with a threshold of an acceptable risk of damage. Step 305 assesses a user calendar to determine whether a protective action is acceptable. Step 306 instructs the autonomous vehicle 110 to take a protective action.

Figure 10:
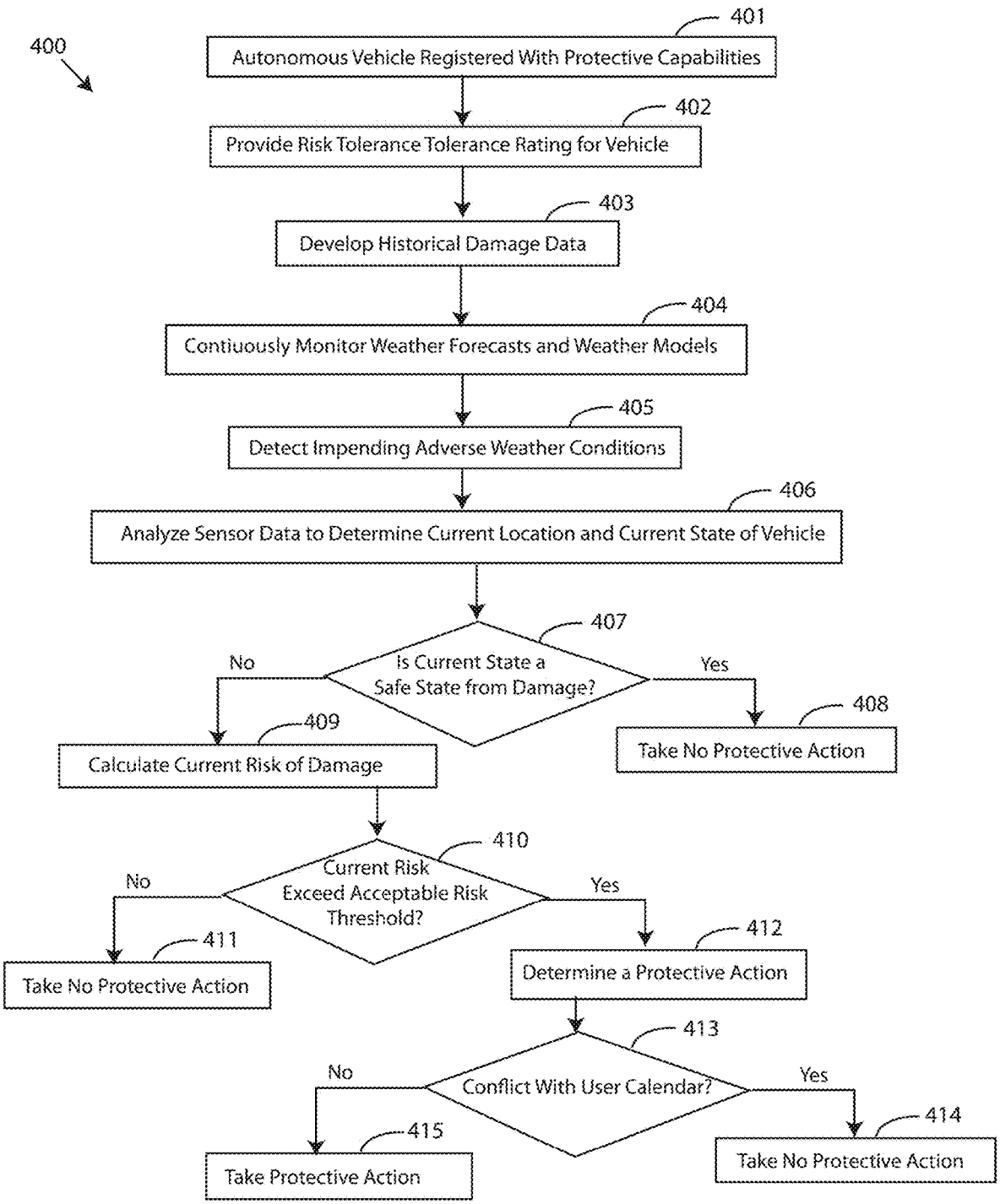
FIG. 10 depicts a detailed flow chart of the method of FIG. 9, in accordance with embodiments of the present invention.

FIG. 10 depicts a detailed flow chart of the method of FIG. 9, in accordance with embodiments of the present invention. Method for 400 may begin at step 401, wherein the autonomous vehicle 110 is registered, identifying protective capabilities. Step 402 provides a risk tolerance rating for each autonomous vehicle 110. Step 403 develops historical damage date for developing an acceptable risk level, such as a threshold of acceptable risk of damage. Step 404 continuously monitors weather forecasts and weather models. Step 405 detects impending weather conditions, as a result of the continuous monitoring in step 404. Step 406 analyzes sensor data to determine a current location and a current state of the autonomous vehicle 110. Step 407 determines whether the current state is a safe state from damage. If yes, then step 408 takes not protective action. If yes, step 409 calculates a current risk of damage. Step 410 determines whether the current risk of damage exceeds the threshold of acceptable risk of damage. If no, then step 211 takes no protective action. If yes, 412 determines which protective action to take. Step 413 determines whether the protective action would conflict with the user calendar. If yes, step 414 takes no protective action. If yes, step 415 instructs the autonomous vehicle 110 to take protective action.

Figure 11:
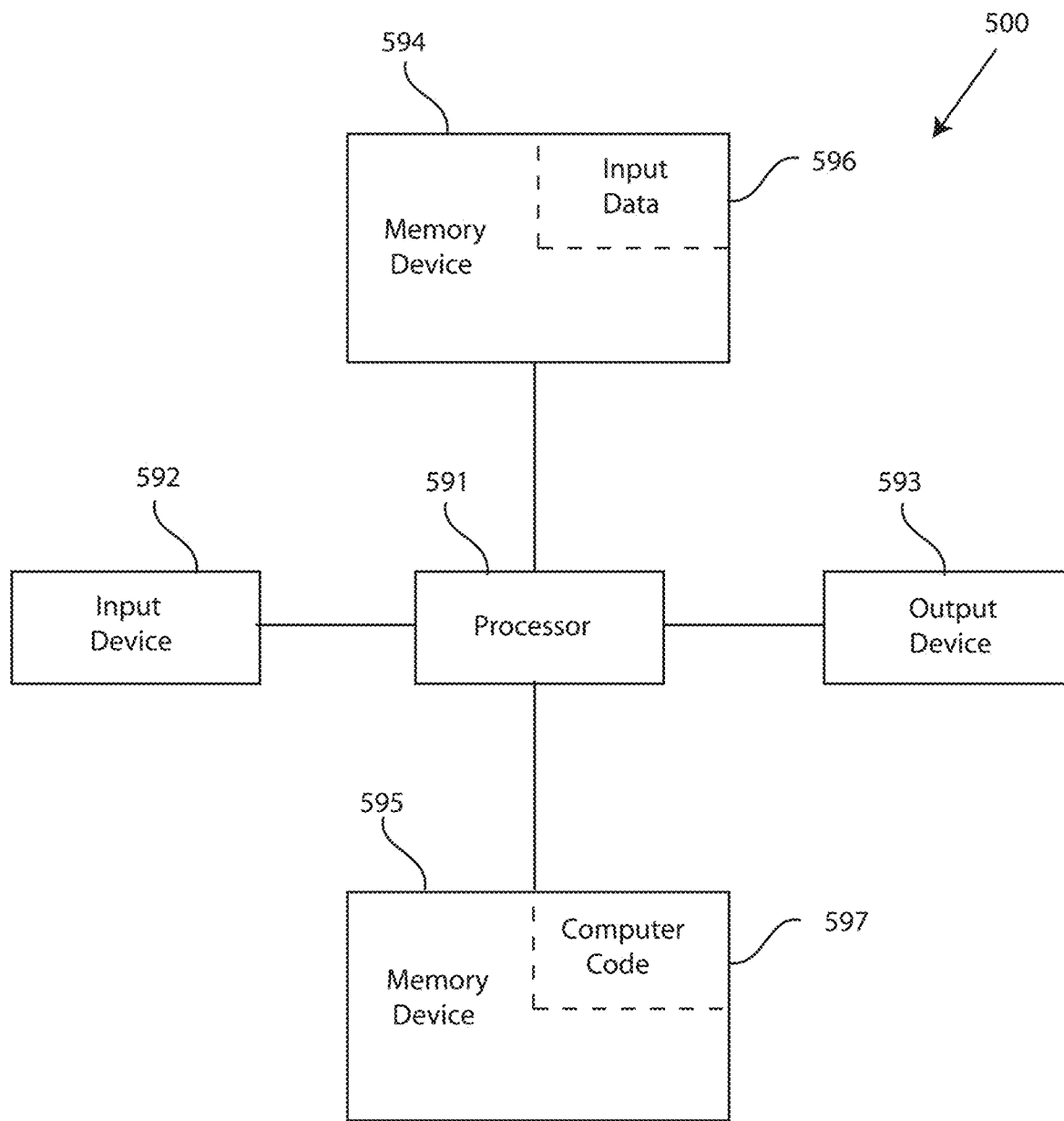
FIG. 11 depicts a block diagram of a computer system for the protective action system of FIGS. 1-8, capable of implementing methods for protecting an autonomous vehicle from damage caused by impending weather conditions of FIGS. 9-10, in accordance with embodiments of the present invention.

FIG. 11 depicts a block diagram of a computer system for protective action system of FIGS. 1-8, capable of implementing methods for protecting an autonomous vehicle from damage caused by impending weather conditions of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for protecting an autonomous vehicle from damage caused by impending weather conditions in the manner prescribed by the embodiments of FIGS. 9-10 using the protective action system 100 of FIGS. 1-8, wherein the instructions of the computer code 597 may be executed by processor 591 via memory device 595. The computer code 597 may include software or program instructions that may implement one or more algorithms for implementing the method for protecting an autonomous vehicle from damage caused by impending weather conditions, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to protective action systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to protect an autonomous vehicle from damage caused by impending weather conditions. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for protecting an autonomous vehicle from damage caused by impending weather conditions. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for protecting an autonomous vehicle from damage caused by impending weather conditions.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
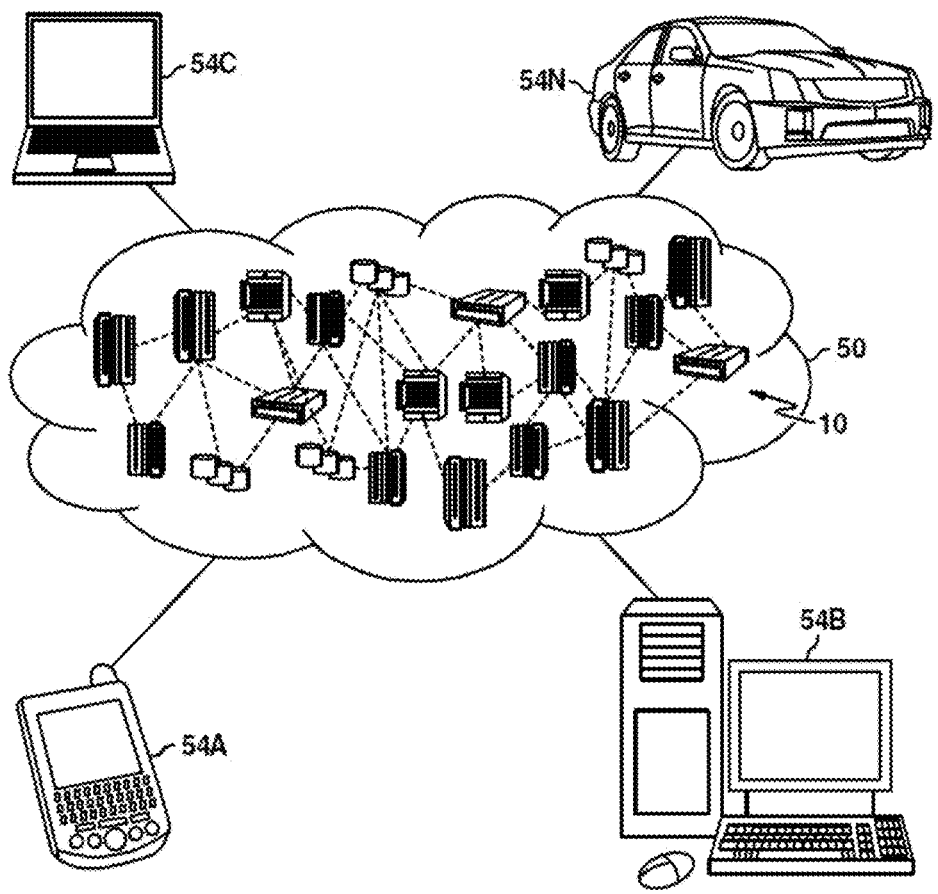
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 13:
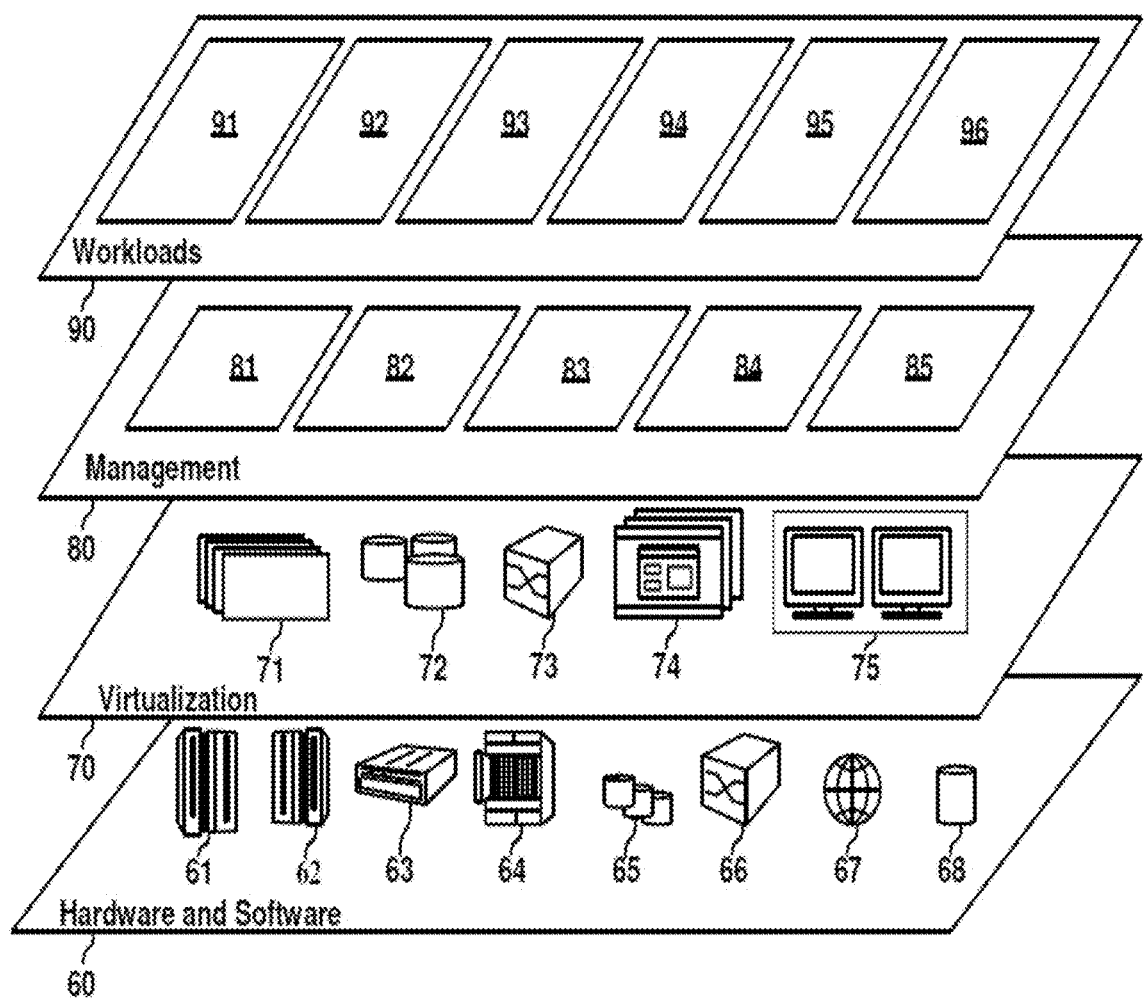
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and protective action instructing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting an autonomous vehicle from damage caused by impending weather conditions, the method comprising:

detecting, by a processor of a computing system, the impending weather conditions for a geographic region, and in response to detecting the impending weather conditions, determining that an initial location of the autonomous vehicle is located in the geographic region affected by the impending weather conditions;

calculating, by the processor, a current risk of damage to the autonomous vehicle based on the impending weather conditions in the geographic region and a current state of the autonomous vehicle;

comparing, by the processor, the current risk of damage to a threshold of acceptable risk of damage, wherein, the current risk of damage exceeds a threshold of acceptable risk;

assessing, by the processor, a user calendar to determine that taking a protective action by the autonomous vehicle is acceptable;

determining, by the processor, which protective action to take based on the current risk of damage and the current state of the autonomous vehicle to change the current state of the autonomous vehicle to a safe state; and instructing, by the processor, the autonomous vehicle to take the protective action so that the current state of the autonomous vehicle is changed to the safe state to avoid damage from the impending weather conditions.

2. The method of claim 1, wherein the current risk of damage is calculated by analyzing, by the processor, a historical damage probability to the autonomous vehicle based on weather conditions similar to the impending weather conditions, and the current state of the autonomous vehicle.

3. The method of claim 2, wherein analyzing the current state includes detecting that the autonomous vehicle is in an unprotected state from sensor data from one or more sensors associated with the autonomous vehicle and one or more environmental sensors.

4. The method of claim 1, further comprising: continuously monitoring, by the processor, a time required to achieve the safe state from the current state for determining a time to instruct the autonomous vehicle to take the protective action.

5. The method of claim 1, further comprising:
instructing, by the processor, the autonomous vehicle to return to the current state, in response to calculating an updated risk of damage based on a current weather condition and a resultant environmental condition, that is below the threshold of acceptable risk of damage;
continuously monitoring, by the processor, a time required to return to the current state from the safe state for determining a time to instruct the autonomous vehicle to return to the current state.

6. The method of claim 1, wherein the autonomous vehicle is at least one of: a self-driving car, a robot, an unmanned aerial vehicle, and an unmanned surface vehicle.

7. A computer system, comprising:
a processor;
a memory device coupled to the processor; and
a computer readable storage device coupled to the processor, wherein the storage device contains program code executable by the processor via the memory device to implement a method for protecting an autonomous vehicle from damage caused by impending weather conditions, the method comprising:
detecting, by a processor of a computing system, the impending weather conditions for a geographic region, and in response to detecting the impending weather conditions, determining that an initial location of the autonomous vehicle is located in the geographic region affected by the impending weather conditions;

calculating, by the processor, a current risk of damage to the autonomous vehicle based on the impending weather conditions in the geographic region and a current state of the autonomous vehicle;

comparing, by the processor, the current risk of damage to a threshold of acceptable risk of damage, wherein, the current risk of damage exceeds a threshold of acceptable risk;

assessing, by the processor, a user calendar to determine that taking a protective action by the autonomous vehicle is acceptable;

determining, by the processor, which protective action to take based on the current risk of damage and the current state of the autonomous vehicle to change the current state of the autonomous vehicle to a safe state; and instructing, by the processor, the autonomous vehicle to take the protective action so that the current state of the autonomous vehicle is changed to the safe state to avoid damage from the impending weather conditions.

8. The computer system of claim 7, wherein the current risk of damage is calculated by analyzing, by the processor, a historical damage probability to the autonomous vehicle based on weather conditions similar to the impending weather conditions, and the current state of the autonomous vehicle.

9. The computer system of claim 8, wherein analyzing the current state includes detecting that the autonomous vehicle is in an unprotected state from sensor data from one or more sensors associated with the autonomous vehicle and one or more environmental sensors.

10. The computer system of claim 7, further comprising: continuously monitoring, by the processor, a time required to achieve the safe state from the current state for determining a time to instruct the autonomous vehicle to take the protective action.

11. The computer system of claim 10, further comprising:
instructing, by the processor, the autonomous vehicle to return to the current state, in response to calculating an updated risk of damage based on a current weather condition and a resultant environmental condition, that is below the threshold of acceptable risk of damage;
continuously monitoring, by the processor, a time required to return to the current state from the safe state for determining a time to instruct the autonomous vehicle to return to the current state.

12. The computer system of claim 7, wherein the autonomous vehicle is at least one of: a self-driving car, a robot, an unmanned aerial vehicle, and an unmanned surface vehicle.

13. A computer program product, comprising a computer readable hardware storage device storing a computer readable program code, the computer readable program code comprising an algorithm that when executed by a computer processor of a computing system implements a method for protecting an autonomous vehicle from damage caused by impending weather conditions, the method comprising:
detecting, by a processor of a computing system, the impending weather conditions for a geographic region, and in response to detecting the impending weather conditions, determining that an initial location of the autonomous vehicle is located in the geographic region affected by the impending weather conditions;

calculating, by the processor, a current risk of damage to the autonomous vehicle based on the impending weather conditions in the geographic region and a current state of the autonomous vehicle;

comparing, by the processor, the current risk of damage to a threshold of acceptable risk of damage, wherein, the current risk of damage exceeds a threshold of acceptable risk;

assessing, by the processor, a user calendar to determine that taking a protective action by the autonomous vehicle is acceptable;

determining, by the processor, which protective action to take based on the current risk of damage and the current state of the autonomous vehicle to change the current state of the autonomous vehicle to a safe state; and instructing, by the processor, the autonomous vehicle to take the protective action so that the current state of the autonomous vehicle is changed to the safe state to avoid damage from the impending weather conditions.

14. The computer program product of claim 13, wherein the current risk of damage is calculated by analyzing, by the processor, a historical damage probability to the autonomous vehicle based on weather conditions similar to the impending weather conditions, and the current state of the autonomous vehicle.

15. The computer program product of claim 14, wherein analyzing the current state includes detecting that the autonomous vehicle is in an unprotected state from sensor data from one or more sensors associated with the autonomous vehicle and one or more environmental sensors.

16. The computer program product of claim 13, further comprising: continuously monitoring, by the processor, a time required to achieve the safe state from the current state for determining a time to instruct the autonomous vehicle to take the protective action.

17. The computer program product of claim 16, further comprising:

instructing, by the processor, the autonomous vehicle to return to the current state, in response to calculating an updated risk of damage based on a current weather condition and a resultant environmental condition, that is below the threshold of acceptable risk of damage;

continuously monitoring, by the processor, a time required to return to the current state from the safe state for determining a time to instruct the autonomous vehicle to return to the current state.

* * * * *